3,214,399
POLYPROPYLENE STABILIZED WITH NICKEL ACETYLACETONATE, A HINDERED PHENOL AND CALCIUM STEARATE
Pietro Saccomandi, Bologna, Italy, assignor to Montecatini Società Generale per l'Industria Mineraria e Chimica, Milan, Italy, a corporation of Italy
No Drawing. Filed Sept. 19, 1961, Ser. No. 139,072
Claims priority, application Italy, Sept. 22, 1960, 16,419/60, Patent 636,380
5 Claims. (Cl. 260—23)

The present invention relates to polymeric compositions stabilized against the action of light and to a process for preparing such compositions.

It is known that olefin-type polymers are sensitive to the action of light in the ultraviolet zone between 330 and 340 m$\mu$. (There occurs an absorption of energy with degradative photo-chemical reactions.) This can be observed by exposure of films or laminae of the polymer to direct sunlight or to radiations emitted by fluorescent lamps, carbon arc lamps, etc. The degradation is manifested by variations in mechanical characteristics, yellowing or discoloring of the specimen, formation of surface cracks, variation in the electrical properties, etc.

In the case of polypropylene, it has been observed that the deterioration in mechanical and electrical characteristics (such as e.g., resilience and loss factor) is coincident with the formation of surface cracks in the exposed specimens.

The stabilization of polypropylene against ultraviolet radiation by the addition of salicylic acid esters (absorbers for wave lengths lower than 340 m$\mu$) is practically negligible.

The use of benzothiazoles has also not produced satisfactory results. The best ultraviolet absorbers for polypropylene known heretofore belong to the class of hydroxybenzophenones. These materials can in fact absorb the light in the whole ultraviolet zone included in the sun spectrum, i.e., from 300 to 400 m$\mu$. Polypropylene, e.g., can be effectively protected against sun radiations by the addition of 2,2-dihydroxy-4-octyloxybenzophenone. However, since the absorbing power of 2,2-dihydroxy-4-octyloxybenzophenone is also effective to a limited extent in the spectrum of the visible region, the polymers treated therewith show a remarkably yellow color.

Certain nickel derivatives (e.g., "Ferro AM–101," i.e., a nickel phenol phenolate containing about 6% of nickel and sulfur) have recently been tested as stabilizers with satisfactory results. However, in order to incorporate this product into polypropylene by rolling, temperatures of about 240° C. must not be exceeded, in order to avoid decomposition and degradation of the polymer and the formation of an intense black color.

I have now surprisingly found that nickel acetylacetonate has a light-stabilizing action for polypropylene which is virtually equal to the stabilizing action of "Ferro AM–101" but does not exhibit (or exhibits only in a reduced form and only at temperatures higher than those generally adopted in extrusion and injection-molding) the degradation inconvenience of the polymers and the formation of a black color, which features characterize the use of "Ferro AM–101," as has been demonstrated by exposure tests on the Atlas Fadeometer (of the type FAA–R).

My invention therefore relates to a new polymeric composition stabilized against light, this composition comprising a crystalline poly-alpha-olefin, more particularly polypropylene, and from 0.05 to 2 percent by weight of nickel acetylacetonate. The polypropylene is a crystalline polypropylene consisting prevailingly of isotactic macromolecules, as defined by Natta et al., e.g. U.S. Patent No. 2,882,263. If desired, the composition may also contain from 0.1 to 2% by weight of an antioxidant which improves the resistance of the "compound" to oxidation, e.g., 2,6-ditertiary-butyl-4-methylphenol, or another phenolic antioxidant compatible with the polyolefin. (The above ranges for the nickel acetylacetonate, and the antioxidant are based upon the weight of the polyolefin.)

The preparation of the composition according to the invention is generally carried out by mixing the compounds in a Banbury mixer or in a roll-mixer. However, the compounds may also be mixed by other methods, such as by mixing the polyolefin with a solution of stabilizer in a suitable solvent followed by evaporation of the solvent, or by adding the stabilizer directly to the polyolefin at the end of the polymerization. The stabilizing action can also be obtained by applying the stabilizer directly to the manufactured article of poly-alpha-olefin, e.g., by immersing the article in a stabilizer solution or dispersion and evaporating off the solvent or dispersing media therefrom.

The following examples will further illustrate the invention without limiting its scope. All parts are by weight unless otherwise stated. All percentages of additives are based on the weight of the polypropylene.

EXAMPLE 1

A sample of polypropylene stabilized with 0.2% of 2,6-ditertiary-butyl-4-methylphenol and 0.2% of calcium stearate was mixed with 0.5% of various ultraviolet absorbers by double roll-mixing.

(a) Resistance to ultraviolet radiation (exposure in the Fadeometer): The samples were molded at 200° C. in the form of 1 x 10 cm. laminae with a thickness of 1 mm. which were exposed in the Fadeometer until the formation of surface cracks. The specimens were put under tension by flexure, i.e., bent so as to subtend a chord of 55 mm.

The following results were obtained.

| Sample: | Resistance, days |
|---|---|
| Without any ultraviolet light absorber | 7 |
| With Ferro AM–101 | 20–25 |
| With 2,2-dihydroxy-4-octyloxybenzophenone | 50–55 |
| Nickel acetylacetonate | 21–26 |

(b) Thermal stability in the processing stage: At increasing temperatures from 200 to 280° C. and for times from 10 to 30 minutes, laminae having a thickness of 3 mm. were molded in a plate press under a pressure of about 50 kg./cm.$^2$ and the color variation was evaluated.

The polyolefin treated with "Ferro AM" showed a discoloring and blackening as the molding times and temperatures were increased, whereas the polymer containing nickel acetylacetonate exhibited less discoloration which, under the most drastic conditions tended at most toward brown-yellow.

The tests clearly showed that for equal discoloring, the polyolefin mixed with nickel acetonate would withstand a temperature of 20–30° C. higher than the same polyolefin mixed with "Ferro AM."

*Appearance of laminae of polypropylene mixed with ultraviolet absorbers as a function of the molding temperatures and times*

TEMPERATURE—220° C.

| Stabilizer | Appearance | | |
|---|---|---|---|
| Time, minutes | 10 | 20 | 30. |
| Nickel acetylacetonate. | Slightly straw-yellow. | Slightly straw-yellow. | Slightly straw-yellow. |
| Ferro AM-101 | ___do___ | ___do___ | Do. |

TEMPERATURE—240° C.

| Time, minutes | 10 | 20 | 30. |
|---|---|---|---|
| Nickel acetylacetonate. | Slightly straw-yellow. | Slightly straw-yellow. | Slightly straw-yellow. |
| Ferro AM-101 | ___do___ | ___do___ | Gray-yellow. |

TEMPERATURE—260° C.

| Time, minutes | 10 | 20 | 30. |
|---|---|---|---|
| Nickel acetylacetonate. | Slightly straw-yellow. | Slightly straw-yellow. | Yellow. |
| Ferro AM-101 | Straw-yellow. | Brown-yellow. | Brown. |

TEMPERATURE—280° C.

| Time, minutes | 10 | 20 | 30 |
|---|---|---|---|
| Nickel acetylacetonate. | Brown-yellow. | Brown-yellow. | Brown-yellow. |
| Ferro AM-101 | Brown. | Brown. | Black. |

EXAMPLE 2

A polypropylene sample was stabilized with the additives reported in Example 1 by mixing the polymers with the various components in a Banbury mixer at about 180° C. for 20 minutes.

From the homogeneous mass some specimens were then prepared which, after the tests carried out as in Example 1, gave the same results.

EXAMPLE 3

To a sample of polypropylene stabilized with 0.2% of 2,6-ditertiary-butyl-4-methylphenol and 0.2% of calcium stearate was added 0.5% of various ultraviolet absorbers. The "melt index" on the polymer molded at various temperatures (ASTM D-1237-57, load of 10 kg.) was determined. The results obtained are reported in the following table. It is evident that the thermal degradation (variation of the melt index) caused by "Ferro AM-101" is clearly higher than that caused by nickel acetylacetonate.

| | 10 Minutes at 220° Melt Index B Color | 10 Minutes at 280° Melt Index B Color |
|---|---|---|
| Without ultraviolet absorber. | 3.4 colorless | 3.9 colorless. |
| With Ferro AM-101 | 6.0 slightly greenish | 27.9 almost black. |
| With 2,2-dihydroxy-4-octyloxy-benzo-phenone. | 3.5 yellow | 7.6 yellow. |
| Nickelacetylacetonate | 4.5 slightly green | 5.7 slightly brown. |

Variations can of course be made without departing from the spirit of my invention.

Having thus described my invention, what I desire to secure and claim by Letters Patent is:

1. A polymeric composition stabilized against the action of light and discoloration above 240° C. consisting essentially of a crystalline polypropylene, a phenolic antioxidant, and an inorganic salt of stearic acid, nickel acetylacetonate in proportions of from about 0.05 to 2% by weight of said polypropylene, a hindered phenolic antioxidant in proportions of from about 0.1% to 2% by weight of said polypropylene and calcium stearate.

2. The polymeric composition of claim 1 wherein the phenolic antioxidant is 2,6-tertiarybutyl-4-methylphenol.

3. The product of claim 1 wherein said nickel acetylacetonate is present in proportions of 0.5% by weight.

4. The product of claim 1 in film form.

5. The product of claim 1 in fiber form.

References Cited by the Examiner

UNITED STATES PATENTS

| | | | |
|---|---|---|---|
| 2,665,265 | 1/54 | Burgess | 260—45.75 |
| 2,971,940 | 2/61 | Fuchsman et al. | 260—45.75 |
| 2,971,941 | 2/61 | Fuchsman et al. | 260—45.75 |
| 2,985,617 | 5/61 | Salyer et al. | 260—45.75 |
| 3,006,885 | 10/61 | Dickson | 260—45.75 |
| 3,006,886 | 10/61 | Schilling | 260—45.75 |
| 3,072,601 | 1/63 | Breslow | 260—45.75 |

FOREIGN PATENTS 837,251    6/60    Great Britain.

LEON J. BERCOVITZ, *Primary Examiner.*

MILTON STERMAN, *Examiner.*

UNITED STATES PATENT OFFICE
CERTIFICATE OF CORRECTION

Patent No. 3,214,399                 October 26, 1965

Pietro Saccomandi

It is hereby certified that error appears in the above numbered patent requiring correction and that the said Letters Patent should read as corrected below.

Column 1, lines 16 and 17, for "330 and 340 mµ" read -- 330 and 440 mµ --; column 4, line 24, for "weight of said polypropylene and calcium stearate." read -- weight of said polypropylene, and calcium stearate. --; column 4, lines 19 and 20, strike out "crystalline polypropylene, a phenolic antioxidant, and an inorganic salt of stearic acid," and insert instead -- crystalline polypropylene consisting prevailingly of isotactic macromolecules, --.

Signed and sealed this 21st day of June 1966.

(SEAL)
Attest:

ERNEST W. SWIDER                            EDWARD J. BRENNER
Attesting Officer                                  Commissioner of Patents